Nov. 3, 1953 E. C. WHITFIELD 2,658,125
CABLE SAFETY FUSE
Filed Dec. 31, 1952
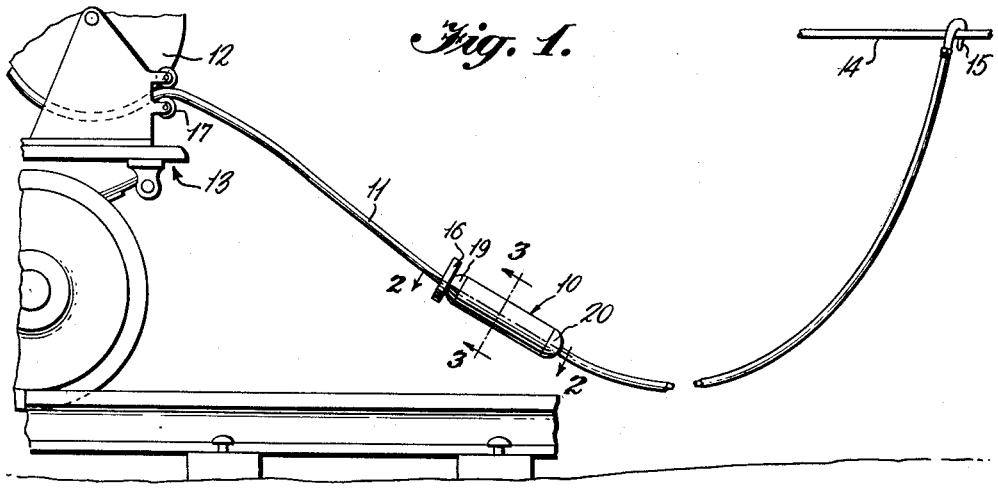
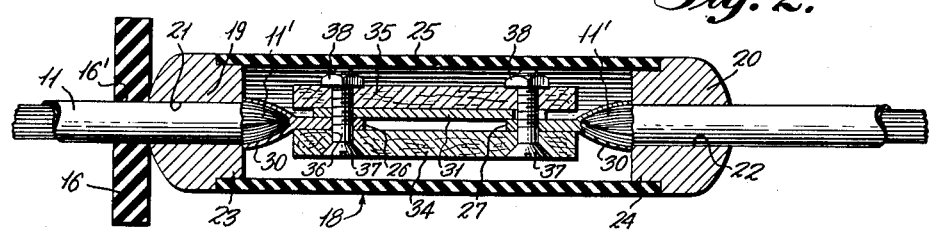
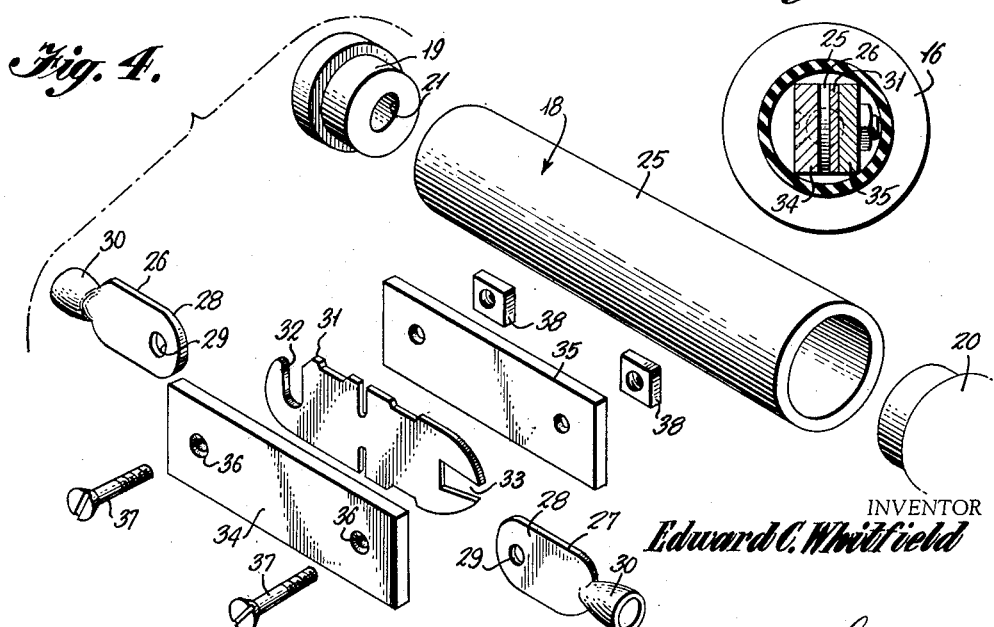
INVENTOR
Edward C. Whitfield
BY Mason, Fenwick & Lawrence
ATTORNEYS Patented Nov. 3, 1953

2,658,125

UNITED STATES PATENT OFFICE 2,658,125

CABLE SAFETY FUSE

Edward C. Whitfield, Kitts, Ky.

Application December 31, 1952, Serial No. 328,839

6 Claims. (Cl. 200—113)

The present invention relates to cable fuses for use in the trailing cables of mine locomotives and other mine machinery which depend for their source of power on cables coupled to a power source and payed out from a reel in accordance with travel from the source of power.

It is common practice in constructing mines to extend the track for mine locomotives considerably beyond the terminal point of the power cable, which are usually in the form of overhead trolley cables. Mine locomotives are conventionally provided with reels, upon which lengths of trailing cable are wound. The trailing cable is connected to the electric power plant of the locomotive and is provided with a conductive hook at its free end adapted to be hooked over a trolley wire and permit the locomotive to travel the length of the track extending beyond the terminus of the trolley cable.

The Federal Mining Code requires that a fuse be installed in the trailing cable as a safety measure, to open-circuit the trailing cable near the end connected to the trolley cable in the event a short-circuit occurs in the cable or the electrical machinery of the locomotive, to prevent ignition of mine fires or release of gases due to overheating of the cable and consumption of the insulation thereon.

Heretofore, the conductive fuse element of such fuses has been directly connected in the trailing cable in such a manner that the fuse element itself bears the tensional strain on the trailing cable resulting from movement of the locomotive away from the trolley cable, resulting in a high rate of breakage of the fuse element.

In many prior art fuses for mine cable use, the fusible element and the fuse housing are formed in such a manner that breakage of the fuse housing opens the circuit through the fuse. Due to the fact that trailing cable fuses are subject to considerable slapping around against the track rails and the floor of the mine, frequent breakage or cracking of portions of the fuse housing result in open-circuting the trailing cable and require replacement of the entire fuse.

An object of the present invention, therefore, is the provision of a novel trailing cable fuse assembly for use with mine locomotives and the like which is designed to obviate the above mentioned disadvantages.

A further object of the present invention is the provision of a novel trailing cable fuse assembly for use with mine locomotives and the like in which components of the fuse assembly are readily replaceable without necessitating replacement of the entire assembly.

Another object of the present invention is the provision of a novel fuse assembly for mine locomotive trailing cables and the like in which means are provided internally of the fuse housing to bear the tensional strain in the trailing cable and prevent open-circuiting of the fuse on breaking of the fuse housing.

Other objects, advantages and capabilities of the present invention will become apparent from the following detail description, taken in conjunction with the accompanying drawing, wherein only a preferred embodiment of the invention is shown.

In the drawing:

Figure 1 is a side elevation of a fuse assembly embodying the present invention shown in position in a mine locomotive trailing cable;

Figure 2 is a horizontal longitudinal section of the trailing cable fuse assembly, taken along the lines 2—2 of Figure 1;

Figure 3 is a vertical transverse section of the trailing cable fuse assembly, taken along the lines 3—3 of Figure 1; and Figure 4 is an exploded perspective view of the components making up the trailing cable fuse assembly.

Referring to the drawing, wherein like reference characters designate corresponding parts throughout the several figures, the fuse assembly embodying the present invention, indicated generally by the reference character 10 is to be interposed in series circuit relation in a trailing cable 11 housed on a reel 12 mounted on a mine locomotive 13 or like mine machine which relies on electric energy being supplied to the electric motive machinery thereof from a remote source of supply such as the overhead trolley cable 14. As illustrated in Figure 1, the free end of the trailing cable 11 is provided with a hook 15 of copper or like highly conductive material, which is slipped over the overhead trolley cable 14 as the mine locomotive starts down a spur track which is not supplied with a power cable, and the trailing cable 11 is payed off of the reel 12, so that a continuous source of electric power is transmitted through the cable 11 to the motive machinery of the locomotive 13.

The fuse assembly 10 is provided with a cable stop 16 in the form of a disc, preferably of rubber material, having a central aperture 16' accommodating the trailing cable 11. The cable stop 16 is preferably formed of rubber, and is of such a diameter as to engage the roller guide 17 associated with the reel 12 on the mine locomotive 13 and prevent drawing the fuse assembly 10 through the guide rollers and on to the reel.

The reel 12 may be driven through a suitable friction clutch in accordance with conventional practice, in which event abutment of the cable stop 16 with the roll guide 17 places the required tension on the cable to disengage the friction clutch driving the reel 12.

The fuse assembly is provided with an outer housing 18, comprising a pair of end plugs 19, 20, preferably of insulated material, adapted to be slipped over the cut ends 11' of the trailing cable 11 and having central bores 21, 22 extending therethrough to accommodate the trailing cable 11. The end plugs 19 and 20 are preferably circular in cross-section, and the facing ends of the end plugs are provided with portions of reduced diameter, as indicated at 23, 24, over which the ends of a tubular housing member 25 are fitted to provide a complete housing enclosure. The tubular member 25 may be made of rubber or of suitable plastic or fiber material. If the tubular member 25 is made of rubber, the reduced diameter portions 23, 24 of the end plugs 19 and 20 may be cut smooth, and the tube 25 be of a size to provide a secure frictional grip between the end plugs and the tubular member. If the tubular member 25 is formed of plastic or fiber, threads must be cut in the inner surface of the tube at the opposite ends thereof, and on the reduced diameter portions 23, 24 of the end plugs to provide a threaded intercoupling therebetween.

A pair of copper terminal elements 26, 27 are provided, each having a flat contact portion 28 having an aperture 29 therein and a cup-shaped portion 30 to receive the ends 11' of the conductive core of the trailing cable 11. The terminal elements 26, 27 are preferably made of copper, and since these are strain or low-bearing elements, the ends 11 of the trailing cable must be securely held in the cup-shaped portions 30 as by welding or brazing the elements together.

The fused link 31 which is of standard commercial form and is cut to a size to fuse on conduction of greater than a preselected critical current, is provided with notches 32, 33 at the opposite ends thereof adapted to overlie the apertures 29 in the contact plates 28 of the terminal elements 26, 27 with the ends of the fused link 31 in electrical contact with the terminal elements 26, 27. The terminal elements 26, 27 are interconnected, however, by means of a pair of load-bearing fiber blocks 34, 35, having apertures 36. The tension blocks 34, 35 are placed in side-by-side relation overlying opposite faces of the fused link 31 and flat portions 28 of the terminal elements 26, 27, with the apertures 36 thereof in registry with the apertures 29 of the terminal elements and notches 32, 33 of the fused link 31, and mounting bolts 37 are inserted through the aligned apertures and notches and secured by nuts 38 to form a rigid load-bearing assembly.

It will be apparent that the fused link 31 of this fuse assembly can be readily replaced, by sliding the end plugs 19 and 20 away from each other along the trailing cable 11 to withdraw the tubular cover member 25 from over the fused link, loosening the nuts 38 on the mounting bolts 37 to spread the tension blocks 34 and 35 apart and slipping the fused link 31 off of the mounting bolts 37.

In this fuse assembly, the tension in the trailing cable 11 will be carried by the two fiber blocks 34, 35 interconnected between the terminal elements 26 and 27 so that no strain is carried by the fused link itself. Further, the housing components of this fuse assembly may be readily replaced avoiding the costly replacement of complete fuse units such as occurs when the fuse housing is slapped or bounced against the track rails or other hard objects due to a tight trailing cable. Also, since the tension carrying components of this fuse assembly are mounted inside of the housing, breaking of the outer fuse housing does not open-circuit the trailing cable.

While but one particular embodiment of the invention has been particularly shown and described, it is distinctly understood that the invention is not limited thereto but that various modifications may be made in the invention without departing from the spirit and scope thereof, and it is desired, therefore, that only such limitations shall be placed thereon as are imposed by the prior art and are set forth in the appended claims.

What is claimed is:

1. The combination in a trailing cable for mine locomotives and the like, of a fuse unit comprising a pair of conductive terminal members adapted to support a conductive fuse link having notched ends therebetween, said terminal members each having a portion to be secured in electrical contact with the core of said trailing cable to interpose said fuse link in series therein and a contact portion to be held in electrical contact with an end of said fuse link, a pair of laterally spaced tension-bearing blocks of insulating material extending between said terminal members and defining a space between said blocks for the reception of said fuse link, said tension-bearing blocks being secured at their ends to said terminal members whereby tensional strain in said trailing cable is transmitted through said blocks, mounting members on said terminal members to be received in the end notches in said fuse link and support the same in electrical contact with said terminal members, housing means supported by said trailing cable and surrounding said fuse link and terminal members, a portion of said housing being removable from surrounding relation with said blocks and terminal members to permit replacement of said fuse link.

2. The combination in a trailing cable for mine locomotives and the like, of a fuse unit comprising a pair of conductive terminal members adapted to support a conductive fuse link having notched ends therebetween, said terminal members each having a socket portion to receive and be secured in electrical contact with the core of said trailing cable to interpose said fuse link in series therein and a contact portion to be held in electrical contact with an end of said fuse link, a pair of laterally spaced tension-bearing blocks of insulating material extending between said terminal members and defining a space between said blocks for the reception of said fuse link, said tension-bearing blocks being secured at their ends to said terminal members whereby tensional strain in said trailing cable is transmitted through said blocks, mounting members on said terminal members to be received in the end notches in said fuse link and support the same in electrical contact with said terminal members, and housing means supported by said trailing cable and surrounding said fuse link and terminal members, a portion of said housing being removable from surrounding relation with said blocks and terminal members to permit replacement of said fuse link.

3. The combination in a trailing cable for mine locomotives and the like, of a fuse unit comprising a pair of conductive terminal members adapted to support a conductive fuse link having notched ends therebetween, said terminal members each having a socket portion to receive and be secured in electrical contact with the core of said trailing cable to interpose said fuse link in series therein and an apertured contact portion to be held in electrical contact with an end of said fuse link, a pair of laterally spaced tension-bearing blocks of insulating material extending between said terminal members and defining a space between said blocks for the reception of said fuse link, said tension-bearing blocks having apertures adjacent the ends thereof to be disposed in registry with the apertures in said contact portions of said terminal members, mounting bolts extending through said apertures in said terminal members and said blocks to intercouple the same and transmit tensional strain in said cable through said blocks, one of said blocks being spaced from said contact portion to expose a portion of said mounting bolts to be received in the end notches of said fuse link and support said fuse link, and housing means supported by said trailing cable and surrounding said fuse link and terminal members, a portion of said housing being removable from surrounding relation with said blocks and terminal members to permit replacement of said fuse link.

4. The combination in a trailing cable for mine locomotives and the like, of a fuse unit comprising a pair of conductive terminal members adapted to support a conductive fuse link having notched ends therebetween, said terminal members each having a socket portion to receive and be secured in electrical contact with the core of said trailing cable to interpose said fuse link in series therein and an apertured contact portion to be held in electrical contact with an end of said fuse link, a pair of laterally spaced tension-bearing blocks of insulating material extending between said terminal members and defining a space between said blocks for the reception of said fuse link, said tension-bearing blocks having apertures adjacent the ends thereof to be disposed in registry with the apertures in said contact portions of said terminal members, mounting bolts extending through said apertures in said terminal members and said blocks to intercouple the same and transmit tensional strain in said cable through said blocks, one of said blocks being spaced from said contact portion to expose a portion of said mounting bolts to be received in the end notches of said fuse link and support said fuse link, and a pair of end plugs of insulating material slidably mounted on said trailing cable and disposed outwardly of said terminal members and a tubular jacket removably intercoupled with said end plugs to form a removable housing enclosure for said blocks and terminal members.

5. The combination in a trailing cable for mine locomotives and the like, of a fuse unit comprising a pair of conductive terminal members adapted to support a conductive fuse link having notched ends therebetween, said terminal members each having a socket portion to receive and be secured in electrical contact with the core of said trailing cable to interpose said fuse link in series therein and an apertured contact portion to be held in electrical contact with an end of said fuse link, a pair of laterally spaced tension-bearing blocks of insulating material extending between said terminal members and defining a space between said blocks for the reception of said fuse link, said tension-bearing blocks having apertures adjacent the ends thereof to be disposed in registry with the apertures in said contact portions of said terminal members, mounting bolts extending through said apertures in said terminal members and said blocks to intercouple the same and transmit tensional strain in said cable through said blocks, one of said blocks being spaced from said contact portion to expose a portion of said mounting bolts to be received in the end notches of said fuse link and support said fuse link, and a pair of end plugs of insulating material slidably mounted on said trailing cable and disposed outwardly of said terminal members and a tubular jacket of resilient material frictionally gripping a reduced diameter portion of each of said end plugs to form a removable housing enclosure for said blocks and terminal members.

6. The combination in a trailing cable for mine locomotives and the like, of a fuse unit comprising a pair of conductive terminal members adapted to support a conductive fuse link having notched ends therebetween, said terminal members each having a socket portion to receive and be secured in electrical contact with the core of said trailing cable to interpose said fuse link in series therein and an apertured contact portion to be held in electrical contact with an end of said fuse link, a pair of laterally spaced tension-bearing blocks of insulating material extending between said terminal members and defining a space between said blocks for the reception of said fuse link, said tension-bearing blocks having apertures adjacent the ends thereof to be disposed in registry with the apertures in said contact portions of said terminal members, mounting bolts extending through said apertures in said terminal members and said blocks to intercouple the same and transmit tensional strain in said cable through said blocks, one of said blocks being spaced from said contact portion to expose a portion of said mounting bolts to be received in the end notches of said fuse link and support said fuse link, and a pair of end plugs of insulating material slidably mounted on said trailing cable and disposed outwardly of said terminal members and a tubular jacket threadedly intercoupled at its ends with a reduced diameter portion of each of said end plugs to form a removable housing enclosure for said blocks and terminal members.

EDWARD C. WHITFIELD.

References Cited in the file of this patent

UNITED STATES PATENTS

| Number | Name | Date |
| --- | --- | --- |
| 1,798,859 | Woodruff | Mar. 31, 1931 |
| 1,798,860 | Woodruff | Mar. 31, 1931 |
| 1,947,503 | Shunk | Feb. 20, 1934 |